United States Patent [19]

Hermansdorfer et al.

[11] 4,401,932

[45] Aug. 30, 1983

[54] SYNCHRO-TO-STEP DATA CONVERTER

[75] Inventors: James E. Hermansdorfer; William T. Spurgin, both of Charlottesville, Va.

[73] Assignee: Sperry Corporation, New York, N.Y.

[21] Appl. No.: 229,477

[22] Filed: Jan. 29, 1981

[51] Int. Cl.³ .............................................. G05B 19/40
[52] U.S. Cl. ............................... 318/696; 340/347 SY
[58] Field of Search ............................... 318/604, 696; 340/347 AD, 347 DD, 347 SY, 347 M; 364/603

[56] References Cited

U.S. PATENT DOCUMENTS 4,173,014 10/1979 Leighou et al. ............. 340/146.3 H Primary Examiner—J. V. Truhe
Assistant Examiner—Saul M. Bergmann
Attorney, Agent, or Firm—Howard P. Terry

[57] ABSTRACT

A synchro-to-step data converter for coupling one of a plurality of different synchro transmitters to one of a plurality of different step motors. The three wire output data of a synchro transmitter is demodulated into a three bit binary step data code and is applied to digital decoding means. The digital decoding means converts the step data code into a format suitable for application to a particular step motor and/or compensates for the speed of the synchro input shaft relative to the step motor output shaft.

14 Claims, 7 Drawing Figures

| DATA CYCLE CODE | | | | | | |
|---|---|---|---|---|---|---|
| | 1 | 2 | 3 | 4 | 5 | 6 |
| A | 1 | 1 | 1 | 0 | 0 | 0 |
| B | 0 | 0 | 1 | 1 | 1 | 0 |
| C | 1 | 0 | 0 | 0 | 1 | 1 |

4,401,932

SYNCHRO-TO-STEP DATA CONVERTER

BACKGROUND OF THE INVENTION

1. Field of the Invention

The present invention relates to analog-to-digital converters, and more specifically to synchro-to-step data converters useful for driving step motors.

2. Description of the Prior Art

Synchro transmitters are electromechanical devices having a rotor and a plurality of stator windings for transforming an angular-position input into an analog electrical output, whereas step motors are electromechanical digital data input devices which convert electrical pulses into proportionate mechanical movement. Since synchro transmitters are analog data output devices, and since step motors are digital data input devices, there is a need for a converter whenever it is desired to use synchro data output to position a step motor. The requirement of synchro-to-step data conversion is frequently encountered in the art of shipboard navigation systems in which gyrocompasses having synchro data output are operatively coupled to repeaters, radar equipment, and autopilots designed for step data input. Such systems may typically utilize 360x (1 revolution per degree of heading) torque synchro data transmission from the gyrocompass and may typically have repeaters, radar equipment, and autopilots which require step data that completes one cycle per degree of heading. Such step data will be called '360x' herein, even though the actual step motor shaft, if the motor is of the 2-pole variable reluctance type, will rotate at 180X with respect to heading. The data conversion requirement is often further complicated when the gyrocompass of one manufacturer is operatively coupled to the step data input device of another manufacturer, since different manufacturers typically utilize different types of synchro data output and/or step data input.

A synchro-to-digital converter well adapted to convert synchro data at a predetermined voltage and frequency to a three bit binary code is disclosed in U.S. Pat. No. 4,031,531, entitled "Synchro-to-Digital Converter", and assigned to the Applicants' assignee. The above referenced converter is designed such that each of the output signals from a synchro device is applied to an individual voltage comparator through a step-down transformer. Each comparator is biased to a predetermined threshold level and produces an output signal whenever the magnitude of the associated synchro signal exceeds the threshold in the proper polarity. The comparator output voltages are applied to individual clocked flip-flops so as to produce three binary output signals in a parallel format indicative of the rotor displacement of the synchro device. The above described converter, however, is not designed to convert one of a plurality of different synchro data outputs into one of a plurality of different step data inputs.

Accordingly, there is a need for a synchro-to-step data converter which is capable of performing conversions among the various types of synchro data outputs and step data inputs. In the shipboard navigation systems are, for example, there is a particular need for such a device since it would provide for the efficient operative coupling of gyrocompasses providing 360x or other high transmission speed synchro data output and step data input equipment manufactured by different manufacturers which heretofore have been considered incompatible without the costly design of a unique converter limited to a particular application.

SUMMARY OF THE INVENTION

According to the practice of the present invention, a synchro-to-step data converter converts one of a plurality of different synchro data outputs to one of a plurality of different step data inputs. It is intrinsic in the present invention that the step motor resolution cannot be greater than 1/6 of a revolution of the synchro. Therefore, if the nominal data transmission speed of the step motor is higher than that of the synchro transmitter, there will be a loss of resolution of the step motor-driven device through the use of the present invention. If, on the other hand, the data transmission speed of the step motor equals or is less than the data transmission speed of the synchro, there will be no loss of resolution in the step motor-driven device. The interface circuit or receiving means of the converter is capable of receiving synchro data input having a plurality of different voltage and frequency characteristics, and the receiving means applies the received synchro data input to phase sensitive demodulator means. The phase sensitive demodulator means detects phase changes of the synchro data input signals and applies a d.c. output voltage to bistable pulse generator means as the synchro input signals change phase. The output of the bistable pulse generator means are rectangular waveforms or step data command signals expressed in a special three bit binary code, as defined in the truth table of FIG. 6. This code will be called "standard step code" hereinafter.

In those cases where synchro data at a given transmission speed is to be converted to standard step code of FIG. 6 at the same data transmission speed, these step data command signals are applied directly to three power amplifiers for driving the step motor(s).

In those cases where the step code is other than the standard step code of FIG. 6, and/or where the transmission speed of the step data is lower than that of the synchro data, the step data command signals are applied to digital decoding means which preferably includes TTL logic circuits or a microprocessor. The digital decoding means compensates for the transmission speed of the synchro input data and/or converts the step data command signals expressed in the standard step code to another binary code. The output of the digital decoding means drives a particular step motor via a plurality of power amplifiers.

DESCRIPTION OF THE PREFERRED EMBODIMENT

Figure 1:
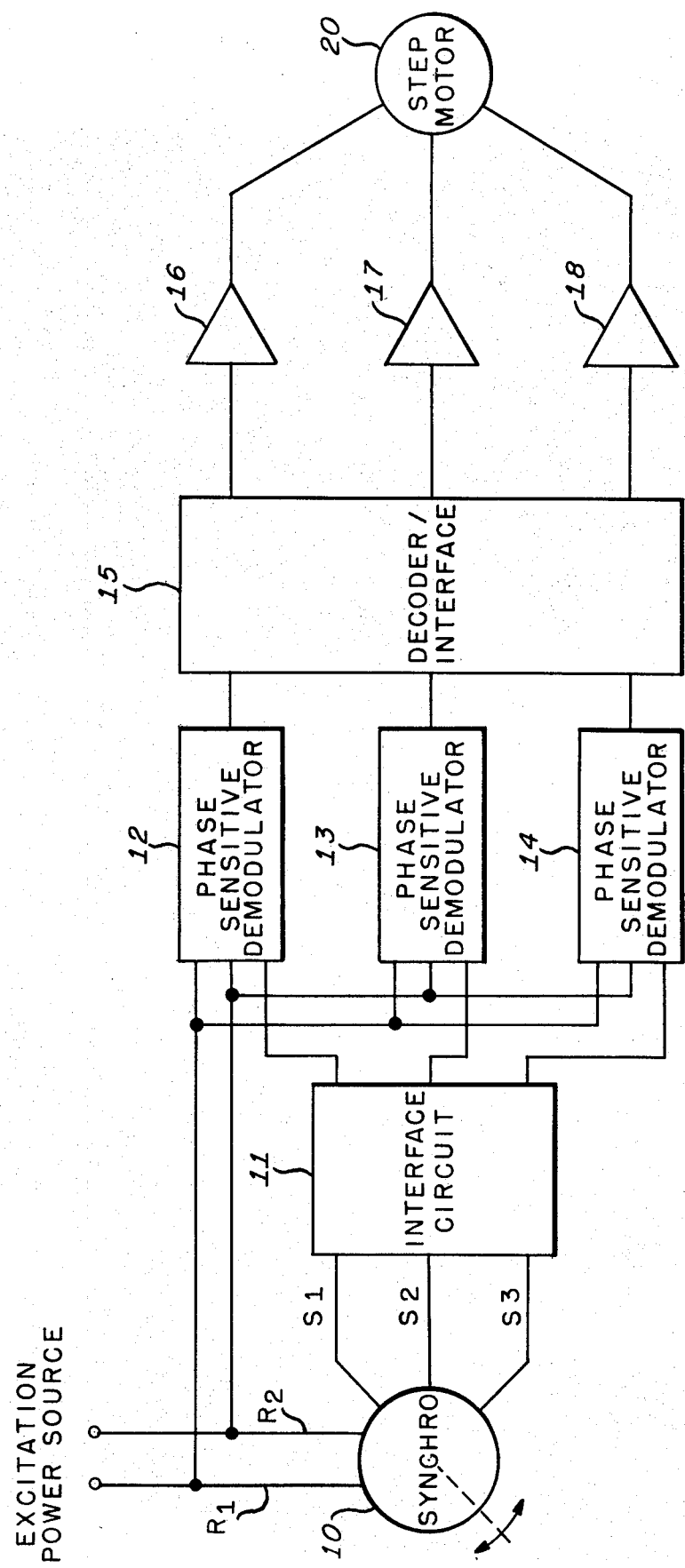
FIG. 1 is a functional block diagram of the apparatus of the present invention.

Referring to FIG. 1, a functional block diagram illustrates the apparatus of the present invention. A typical synchro transmitter 10 includes a plurality of output leads for transmitting a reference voltage which is associated with the rotor and synchro output voltages S1, S2, S3, which are associated with the stator windings. Typically, synchro transmitters are excited by alternating voltages of 115 volts/60 cycles, 115 volts/400 cycles, 26 volts/400 cycles or the like which are applied to the rotor and which induce the output voltages in the stator windings. Accordingly, the apparatus of the present invention includes an interfacing circuit 11 preferably comprised of a plurality of transformers which are capable of receiving a plurality of different synchro output voltages having various voltage and frequency characteristics. Phase sensitive demodulating means 12, 13, 14 receive the synchro output voltages from the interface circuit 11 and demodulate the synchro output voltages into the three bit binary step data code of FIG. 6 as the synchro voltages change phase. The demodulated synchro output voltages or step data command signals are applied to a decoder/interface circuit 15 for decoding if required, into a format suitable for application to the power amplifiers 16, 17, 18 and for driving a step motor 20. The step motor 20 of FIG. 1 may be any one of several types well known in the art, i.e., the three coil four wire type, the four coil five wire type, etc.

Figure 2A:
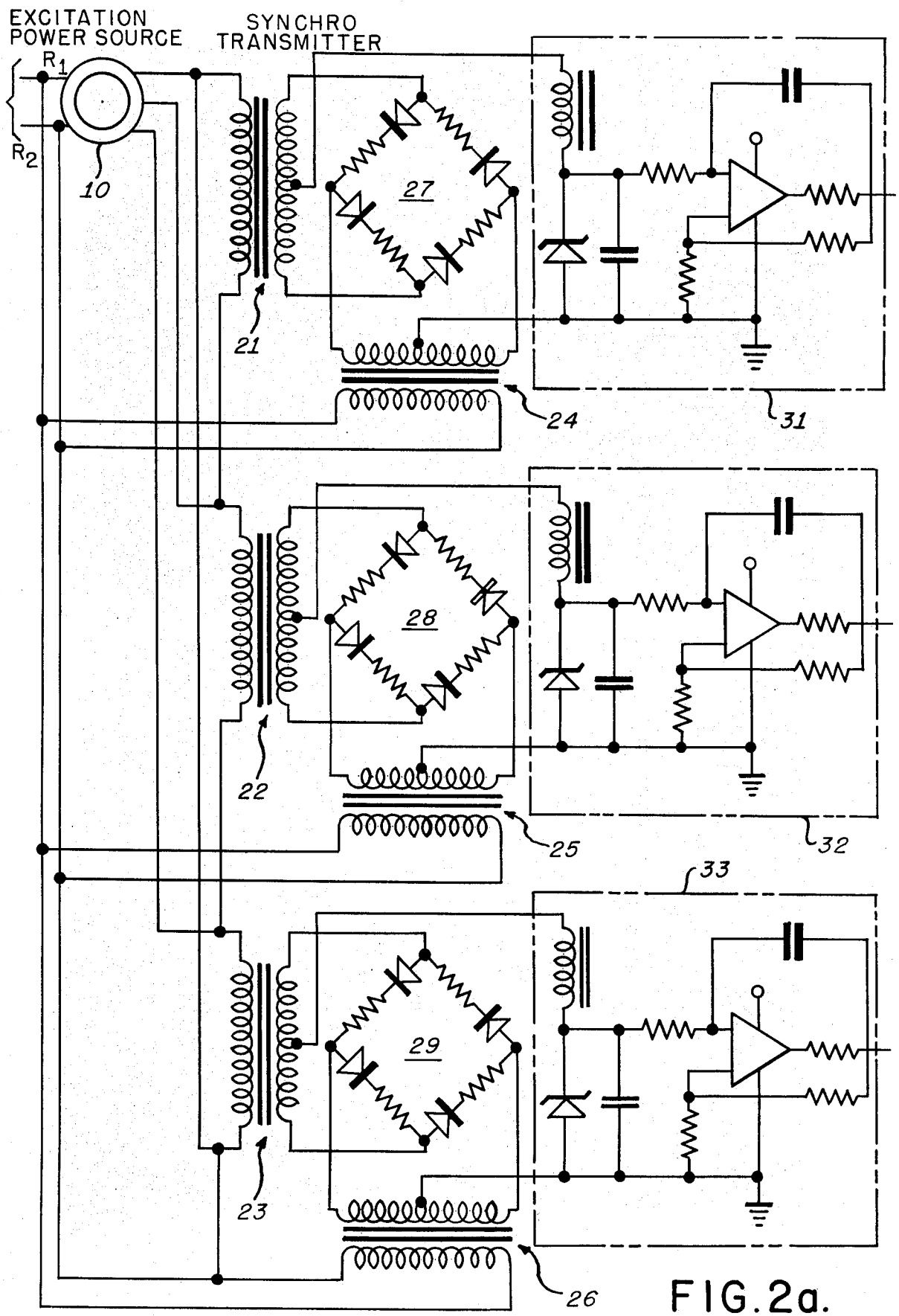
FIG. 2 is a schematic of a preferred embodiment of the present invention.
Figure 2B:
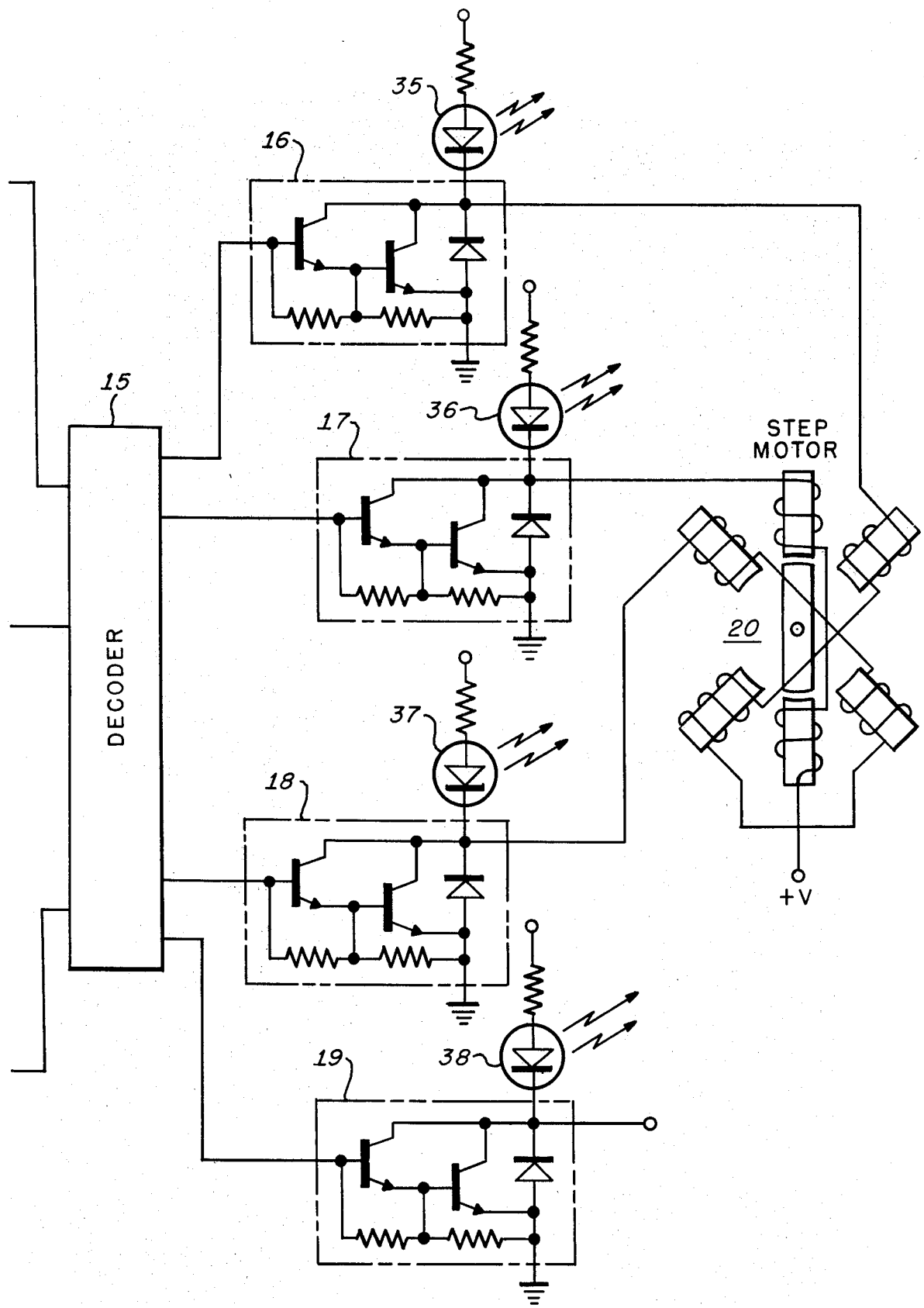

Referring now to FIG. 2, a schematic illustrates a preferred embodiment of the present invention. The synchro data output leads S1, S2, S3 of the synchro transmitter 10 are coupled to transformers 21, 22, 23, and reference voltage leads $R_1$, $R_2$ are coupled to transformers 24, 25, 26, thereby effectively interfacing the output of the synchro transmitter 10 with the apparatus of the present invention. Diode and resistor bridges 27, 28, 29 are responsive to the voltages induced in the secondary windings of transformers 21–26 and useful as phase sensitive detectors for demodulating the synchro data output voltages. The center taps of the secondary windings of transformers 21, 24; 22, 25; and 23, 26 are coupled to bistable pulse generator means 31, 32, 33 respectively. The bistable pulse generator means 31, 32, 33 are comprised of a plurality of discrete components and an operational amplifier which are effective to filter the demodulated synchro output signals and to provide Schmitt trigger type d.c. output voltages. The d.c. output voltages form a three bit binary step data code similar to that disclosed in U.S. Pat. No. 4,031,531. The d.c. output voltages could, in some instances, be applied directly to power amplifiers 16, 17, 18, if the step motor 20 is of the three coil four wire type well known in the art, which use the standard step code of FIG. 6, and if the step motor 20 operates with the same transmission speed as that of the synchro 10. More preferably, however, the d.c. output voltages are applied to a digital decoding means 15 which is operative to convert the three bit binary step data code to any one of several step data codes well known in the art and which is operative to compensate for the data transmission speed of the synchro 10 relative to that of step motor 20 as hereinafter described in greater detail. Moreover, the power amplifiers 16, 17, 18, 19 are preferably of the Darlington transistor type which are commercially procurable as an integrated circuit, and they are coupled to LED's 35, 36, 37, 38 for indicating when the data lines to the step motor 20 are energized. It should be noted that if the step motor 20 is responsive to a three bit binary step data code, then only the data lines associated with power amplifiers 16, 17, 18 are utilized. If the step motor 20, however, is responsive to a step data code having four or more bits in each command, then a power amplifier 19 or additional power amplifiers would be utilized to apply the command signals to the step motor.

Figure 3:
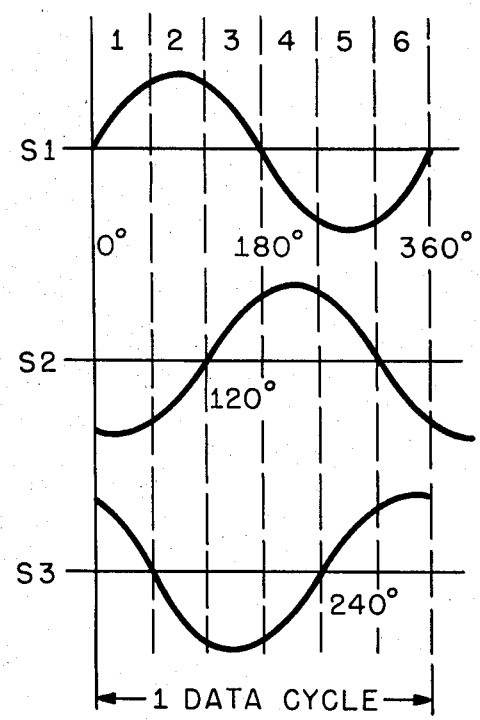
FIG. 3 is a diagram of typical synchro data waveforms.

Referring now to FIG. 3, the operation of the present invention will now be more fully explained through the use of the waveforms illustrated therein. It can be appreciated that the sinusoidal curves labeled S1, S2, S3 are representative of the amplitude of the a.c. voltages at the various stator winding output leads of the synchro transmitter 10 during one data cycle. The data cycle may be divided into six stages and depending upon the amplitude of each sinusoidal curve S1, S2, S3, the three bit binary code, as summarized in the truth table of FIG. 6, may be realized. For example, during Stage I of the data cycle illustrated in FIG. 3, the amplitude of S1 is positive, the amplitude of S2 is negative, and the amplitude of S3 is positive. If positive amplitudes are represented by a logic ONE and negative amplitudes are represented by a logic ZERO, then Stage I may be represented by the three bit binary number 101. Accordingly, Stages II–VI may be represented by the remaining three bit binary numbers in the truth table of FIG. 6.

Figure 4:
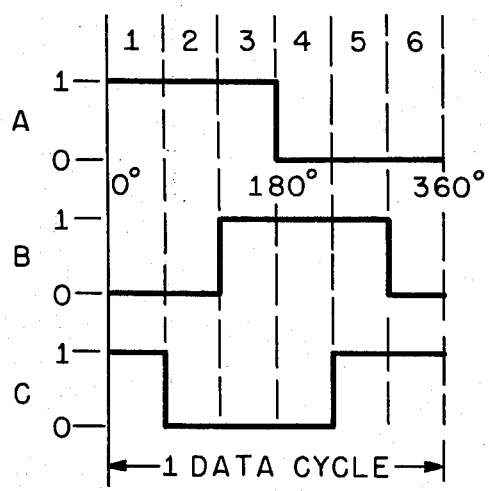
FIG. 4 is a diagram of typical step data waveforms applied to a step motor.
Figures 5, 6:
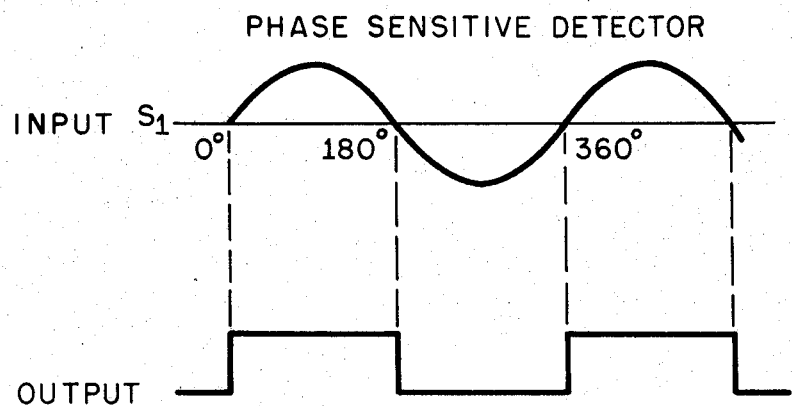
FIG. 5 is a diagram of the input and output waveforms of a phase sensitive detector.
FIG. 6 is a truth table summarizing a three bit binary step data code.

Referring now to FIG. 5, it can be appreciated that in order to realize the binary code of FIG. 6, the curves S1, S2, S3 may be demodulated to a phase sensitive digital format such as depicted by the rectangular waveform labeled A. The resistor and diode bridge 27 coupled to the bistable generator means 31 of FIG. 2 is operative to demodulate the sinusoidal waveform S1 into such a rectangular wave form. Moreover, the bistable pulse generator means 31 utilizes positive feedback for Schmitt trigger switching, thereby providing a small amount of hysteresis when switching and enhancing the stability of the rectangular waveform. Similarly, bistable pulse generator means 32, 33 provide demodulated rectangular waveforms B and C of FIG. 4 in a manner identical to bistable pulse generator means 31.

Referring now to FIG. 4, it can be appreciated that rectangular waveforms labeled A, B, C represent the polarities of the demodulated sinusoidal waveforms, S1, S2, S3, respectively in that a logic level 1 occurs when the demodulated signal is positive and a logic level 0 occurs when the demodulated signal is negative. The rectangular waveforms A, B, C are representative of a three digit binary step data code well known in the art for driving a three coil four wire, step motor and heretofore referred to as standard step code. If a 360x synchro transmitter is utilized and rotates through one revolution, this step data can be applied directly to the power amplifiers 16, 17, 18 of FIG. 1 to drive the three coil four wire step motor 20 through one complete data cycle (½ revolution of a 2-pole variable reluctance step motor). If, however, some other type of synchro transmitter, e.g., a 180x type, is utilized, then the digital decoding means 15 or some other means would be necessary to maintain a one to one relationship between the data transmission speed of the synchro transmitter and that of the step motor. One date cycle from a 180x synchro for example, would cause a three coil four wire step motor to rotate through one data cycle. If the step motor is designed for 360x data transmission, the synchro rotation, which represents 2 degrees of heading, would cause step motor rotation representing only 1 degree of heading. The proper relationship between the data transmission speed of the synchro and that of the step motor, therefore, is preferably maintained by providing the digital decoding means 15 with the capability of multiplying/dividing the bit rate of the bistable pulse generators 31, 32, 33, thereby maintaining the speed of the synchro input shaft relative to the step data output shaft. As heretofore stated, however, multiplication of the bit rate of the bistable pulse generators 31, 32, 33 will cause loss of resolution of the step data. The output of the bistable pulse generators 31, 32, 33, as previously described, is in a three bit binary step data code and the digital decoding means 15 is preferably capable of converting this code to one of several other binary codes known in the art and suitable for driving a particular step motor.

It would be obvious to one skilled in the art to design a digital decoding means 15 which is operative to convert the three digit binary code to another binary code. Moreover, it would be obvious to provide such a decoding means with the capability to multiply/divide the bit rate at which such a converted binary code is applied to the step motor. The digital decoding means 15, therefore, is preferably comprised of TTL logic circuits, if it is necessary that the apparatus of the present invention convert only among a small number of synchro output data types of step motor input types. If it is necessary, however, to convert among several synchro data output types and step motor input types, then it is desirable to utilize a microprocessor and a programmable read only memory (PROM) to provide the necessary binary code conversions and/or rate compensation.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A synchro-to-step data converter for coupling the output of a synchro transmitter to a step motor, comprising:
   means for receiving three wire synchro voltages and a reference voltage;
   phase sensitive detector means for providing d.c. output voltages as the modulated synchro voltages change phase;
   bistable pulse generator means responsive to said d.c. phase sensitive output voltages for generating step data command signals in a three bit binary code; and
   means for coupling said bistable pulse generator means to said step motor so that said step data command signals in said three bit binary code drive said step motor.

2. A converter as in claim 1 wherein said coupling means comprises three power amplifiers for coupling, respectively, to three inputs of said step motor, and for coupling to said bistable pulse generator means.

3. A converter as in claim 1 wherein said coupling means comprises digital decoding means for converting said step data command signals in said three bit binary code to a format suitable for driving a particular step motor and for compensating the speed of said synchro relative to said step motor.

4. A converter according to claim 1 wherein said phase sensitive detector means includes a plurality of diode and resistor bridges.

5. A converter according to claim 2 wherein said phase sensitive detector means includes a plurality of diode and resistor bridges.

6. A converter according to claim 3 wherein said phase sensitive detector means includes a plurality of diode and resistor bridges.

7. A converter according to claim 4 wherein said receiving means comprises a plurality of transformers.

8. A converter according to claim 5 wherein said receiving means comprises a plurality of transformers.

9. A converter according to claim 6 wherein said receiving means comprises a plurality of transformers.

10. A converter according to claim 7 wherein said bistable pulse generator means comprises a plurality of Schmitt triggers coupled to filter means.

11. A converter according to claim 8 wherein said bistable pulse generator means comprises a plurality of Schmitt triggers coupled to filter means.

12. A converter according to claim 9 wherein said bistable pulse generator means includes a plurality of Schmitt triggers coupled to filter means.

13. A converter according to claim 12 wherein said decoding means comprises a microprocessor.

14. A converter according to claim 12 wherein said decoding means comprises digital logic circuits.

* * * * *